Dec. 30, 1952         B. L. MILLS         2,623,792
WHEEL
Filed Feb. 7, 1947
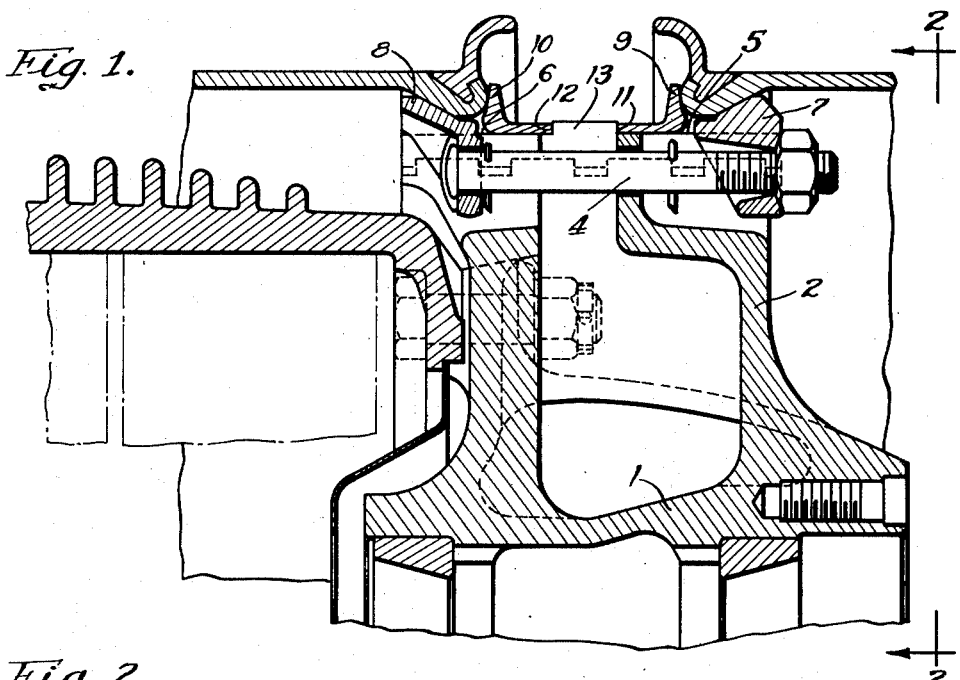
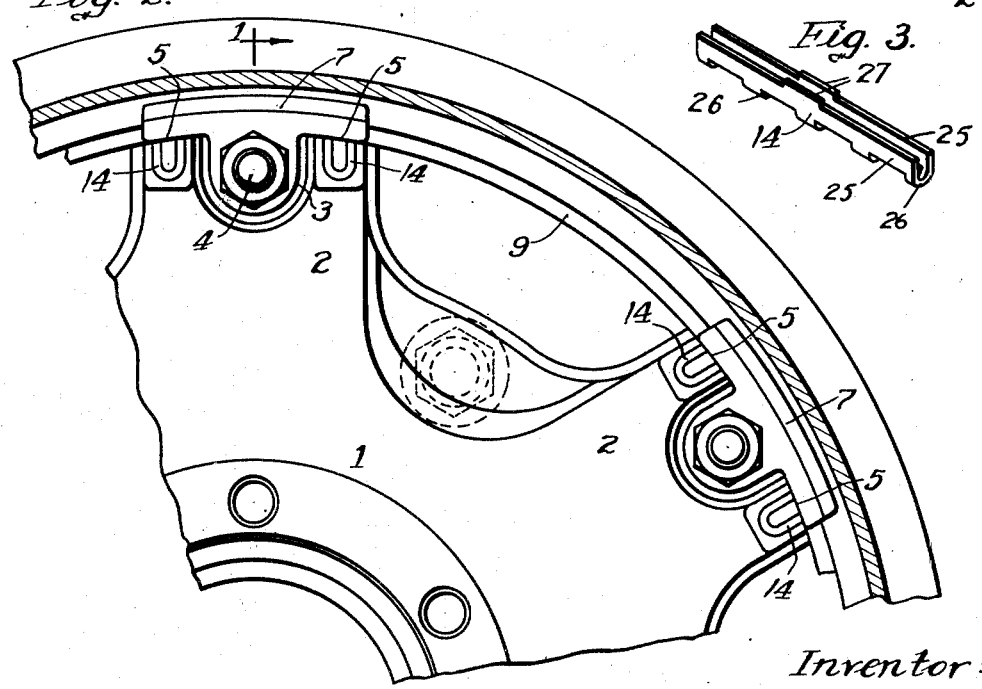
Inventor:
Burton L. Mills
Walter E. Schirmer
By
Attorneys.

Patented Dec. 30, 1952

2,623,792

UNITED STATES PATENT OFFICE 2,623,792

WHEEL

Burton L. Mills, Buchanan, Mich., assignor to Clark Equipment Company, Buchanan, Mich., a corporation of Michigan Application February 7, 1947, Serial No. 727,232

7 Claims. (Cl. 301—13)

This invention relates to an automotive wheel of the demountable rim type, and more particularly to an improvement in the construction of the spoke ends of an automotive wheel formed of light weight metal whereby means are provided to include in that part of the spoke ends which contact the wheel lugs and the spacing rings, a hard metal surface thereby eliminating any tendency of the relatively soft metal spoke end to wear because of such contact.

Whereas the wheel described in the accompanying drawings is a dual automotive wheel of substantially the same design as that described in Burger Reissue Patent Re. 19,885, issued March 10, 1946, it will be readily apparent that this invention is adaptable to any automotive wheel of the demountable rim type.

In previous attempts to produce a light weight metal automotive wheel difficulty has been encountered in attaining a suitable surface for seating the wheel lugs and the spacing rings on the lug seats and spacing ring pilots respectively, of the spoke end. It has been found in operation of the wheel on the road that wear occurs at those points of contact, and in the present invention, I intend to eliminate this defect by providing a perforated hard metal strip which may be secured or inserted in the spoke end by various means, preferably at the time of casting the wheel.

The primary object of this invention is to provide in the spoke ends of a cast light weight metal automotive wheel, a wear resistant surface to receive the wheel lugs and spacing rings, thereby eliminating objectionable wear at the points of contact of the various surfaces.

Other advantages such as simplicity of design and ease and economy of construction will become apparent in the course of the following specification having reference to the accompanying drawings wherein:

Figure 1 is a transverse section of the upper half of the wheel taken on line I—I of Figure 2.

Figure 2 is a side view of the upper half of the wheel; and

Figure 3 is a perspective view of the metal insert.

Referring now to the drawings, I have provided a wheel spider 1 of substantially the same design as that described in the above-referred to Burger patent. Extending radially outwardly of the spider hub are spokes 2 whose outer termini form U-shaped portions (as shown in Figure 2) connected by centrally located webs 3 apertured to receive wheel lug bolts 4. The U-shaped portions of the spoke end extend axially across the spoke end and provide on their outer extremities machined surfaces 5 and 6 for seating the wheel lugs 7 and 8 and spacing rings 9 and 10, and machined surfaces 11 and 12 of shoulder pilot 13 against which abut the inner edges of spacer rings 9 and 10. In each edge of the U-shaped portions of the spoke end is embedded an axially extending U-shaped hard metal reinforcing member 14. The member 14 comprises parallel leg portions 25 interconnected along their edges by spaced apart parallel transverse semi-circular band portions 26. The openings between the band portions 26 allow the metal of the spider to flow through and around the member at the time of casting the wheel, thus permanently embedding and securing the reinforcing members in the spoke ends. Projecting ear portions 27 are formed integrally with the leg portions 25 along their outer edges intermediate of the ends thereof. The ear portions 27 are of the same axial extent as the shoulder pilots 13 and lie parallel thereto when the members 14 are embedded in the spoke ends at each side of the shoulder pilots 13. It will be apparent with this construction that employment of the hard metal reinforcing member 14 provides wear resisting surfaces at surfaces 5, 6, 11, and 12, where wheel lugs 7 and 8 and spacing rings 9 and 10 contact these surfaces of the spoke end.

It will also be apparent that I have provided a simple and effective means for construction and operation of an aluminum automotive wheel whereby wear resistant metals are employed at the points of contact of the wheel lugs and the spoke ends and of the spacing rings and the spacing ring pilots, thus eliminating wear of the metals at these points of contact and providing a light weight durable automotive wheel. While changes may be made in certain details of the illustrated embodiment of the invention herein described, I do not intend to be limited thereto except as defined by the scope and spirit of the appended claims.

I claim:

1. In combination, a wheel spider formed of relatively soft light weight metal having hollow radially extending spokes provided at their ends with laterally extending lug-receiving portions for mounting a rim thereon, said portions having intermediate shoulder pilots, and U-shaped hard metal members embedded in each lug-receiving portion of each of said spoke ends having the ends thereof flush with the surfaces of said portions to form wear surfaces thereon.

2. The combination of claim 1 including shoulder pilot portions formed on said embedded members to provide wear surfaces on said intermediate shoulder pilots of said spoke ends.

3. A spoke end for a spider formed of relatively soft light weight metal comprising integrally formed laterally extending lug-receiving portions having peripheral wear surfaces, hard metal inserts embedded in said portions and forming a plurality of wear surfaces alternating with the parent metal surfaces of said portions, and said inserts comprising channel-shaped members having their ends lying in the plane of the peripheral wear surfaces of said lug-receiving portions.

4. In combination, a wheel spider formed of relatively soft light weight metal having radially extending spokes, and U-shaped hard metal members embedded in the ends of each of said spokes having the edges thereof flush with the end surfaces of said spokes to form wear surfaces thereon.

5. A generally channel shaped hard metal insert adapted to be embedded in the spoke ends of a soft metal wheel spider comprising longitudinally extending parallel leg portions interconnected along their one edges by spaced apart parallel transverse band portions.

6. A generally U-shaped hard metal insert adapted to be embedded in the spoke ends of a soft metal wheel spider comprising longitudinally extending parallel leg portions interconnected along their one edges by spaced apart parallel transverse semi-circular band portions.

7. A generally U-shaped hard metal insert adapted to be embedded in the spoke ends of a soft metal wheel spider comprising longitudinally extending parallel leg portions interconnected along their one edges by spaced apart parallel transverse semi-circular band portions, and projecting ear portions formed integrally with said leg portions along their other edges intermediate of the ends thereof.

BURTON L. MILLS.

REFERENCES CITED

The following references are of record in the file of this patent:

UNITED STATES PATENTS

| Number | Name | Date |
| --- | --- | --- |
| Re. 19,885 | Burger | Mar. 10, 1936 |
| 1,662,901 | Ripley | Mar. 20, 1928 |
| 1,790,230 | Deputy | Jan. 27, 1931 |
| 2,149,113 | Buss | Feb. 28, 1939 |
| 2,190,125 | Sembdner | Feb. 13, 1940 |

FOREIGN PATENTS

| Number | Country | Date |
| --- | --- | --- |
| 433,121 | Great Britain | Aug. 9, 1935 |
| 481,634 | Great Britain | Mar. 15, 1938 |